United States Patent
Birecki et al.

(10) Patent No.: US 6,914,374 B2
(45) Date of Patent: Jul. 5, 2005

(54) PLANAR ELECTRON EMITTER APPARATUS WITH IMPROVED EMISSION AREA AND METHOD OF MANUFACTURE

(75) Inventors: Henryk Birecki, Palo Alto, CA (US); Vu Thien Binh, Lyons (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 413 days.

(21) Appl. No.: 10/043,376

(22) Filed: Jan. 9, 2002

(65) Prior Publication Data

US 2003/0128647 A1 Jul. 10, 2003

(51) Int. Cl.$^7$ ............................ H01J 1/02; H01J 1/30
(52) U.S. Cl. .................. 313/310; 313/495; 313/311
(58) Field of Search .................... 331/309, 336, 331/351, 355, 310, 311, 495, 496; 252/500–502

(56) References Cited

U.S. PATENT DOCUMENTS

| | | | |
|---|---|---|---|
| 4,370,797 A | * 2/1983 | van Gorkom et al. | 438/20 |
| 4,498,952 A | * 2/1985 | Christensen | 438/20 |
| 5,266,155 A | * 11/1993 | Gray | 216/18 |
| 5,557,596 A | 9/1996 | Gibson et al. | |
| 5,835,119 A | 11/1998 | Samuels | |
| 6,011,356 A | 1/2000 | Janning et al. | |
| 6,184,612 B1 | 2/2001 | Negishi et al. | |
| 6,645,402 B1 | * 11/2003 | Kurokawa et al. | 252/502 |

FOREIGN PATENT DOCUMENTS

WO   WO 00/70638   11/2000

OTHER PUBLICATIONS

Serial Process for Electron Emission From Solid–State Field Controlled Emitters, Binh, Vu Thien, Dupin, J.P., Thevenard, P., Purcell, S. T., and Sernet, V., J. Vac. Sci. Technol. B18(2), Mar/Apr 2000, pp. 956–961.

Field Emission From ZrC and ZrC Films on MO Field Emitters, Mackie, W.A., Xie, Tianbao, Matthews, M.R., Routh, Jr., B. P., and Davis, P.R., J. Vac. Sci. Technol. B 16(4), Jul/Aug 1998, pp. 2057–2062.

* cited by examiner

Primary Examiner—Joseph Williams

(57) ABSTRACT

The field emission planar electron emitter device is disclosed that has an emitter electrode, an extractor electrode, and a planar emitter emission layer, electrically coupled to the emitter electrode and the extractor electrode. The planar electron emitter is configured to bias electron emission in a central region of the emission layer in preference to an outer region thereof. One structural example that provides this biasing is achieved by fabricating the planar emitter emission layer so that it has an outer perimeter that is thicker in depth than at an interior portion of the planar emitter emission layer, which reduces electron beam emission at the outer perimeter when an electric field is applied between the emitter electrode and the extractor electrode. The electric field draws emission electrons from the surface of the planar emitter emission layer towards the extractor electrode at a higher rate at the interior portion than at the outer perimeter. The planar electron emitter device further includes a focusing electrode electrically coupled to the planar electron emitter.

14 Claims, 3 Drawing Sheets

PLANAR ELECTRON EMITTER APPARATUS WITH IMPROVED EMISSION AREA AND METHOD OF MANUFACTURE

Another application in emitter devices is described in commonly assigned, co-pending U.S. patent application Ser. No. 10/042,927, entitled "IMPROVED ELECTRON EMITTER DEVICE FOR DATA STORAGE APPLICATIONS AND METHOD OF MANUFACTURE", the disclosure of which is hereby incorporated herein by reference.

BACKGROUND OF THE INVENTION

The present invention relates generally to emitter devices utilized in ultra-high density memory storage systems, and more particularly, the present invention relates to an improved solid state emitter that optimizes electron emission in a central location to improve focusing accuracy.

Memory storage systems have made tremendous advancements over the years from the first use of magnetic tape to magnetic hard drives and now optical drives as well as sophisticated fast memory such as S-RAM and D-RAM. A more recent development has utilized field emission electron emitters within an ultra-high density storage device. The field emission electron emitters have typically been fabricated in tip-geometry that emit beams of electrons from the sharp points at the end of the tips. Electron beams are utilized to read or write to a storage medium that is located proximate the field emitters. An array of field emitters may match the array of storage areas within the storage medium or a smaller array of field emitters may be moved relative to the storage medium to access the storage locations on the storage medium.

An example of an ultra-high density storage device utilizing field emitter technology is disclosed in U.S. Pat. No. 5,557,596. Each field emitter typically generates an electron beam current bound by a storage area to generate a signal current. Each storage area can be in one of a few different states, and are most typically in a binary state of either 1 or 0 represented by a high bit or a low bit. The magnitude of the signal current generated by the beam current impinging on the storage area depends on the state of the storage area. Thus, the information stored in the area can be read by measuring the magnitude of the signal current.

The electron beam may also be utilized to write information into the storage area. The power of each electron beam can be increased to change the state of the storage area on which it impinges. By changing the state of the storage area, a bit of information is stored or erased in the storage area, depending upon the beam strength.

The speed and accuracy of information stored, retrieved, and accessed greatly depend upon the efficiency of the field emitters. Further, the manufacturing steps necessary to produce and fabricate field tip emitters is extremely complex. Furthermore, since the storage medium is spaced apart from the field emitters utilized to read or write the information thereof, it is necessary to place those elements within a protective casing under high-vacuum, on the order of $10^{-7}$ Torr or less, in order to protect the delicate surfaces of both the emitter tips and the memory array from environmental effects. High-vacuums are expensive and difficult to achieve.

Further, in planar electron emitter technology, when a uniform semiconductor layer is applied to the emitter electrode, electron emission tends to take place at the edge of an emitter because of field concentration due to extractor electrode geometry. This is not desired due to significant curvature of electric field lines in that region which causes the beam to become divergent rather than primarily collimated. It is advantageous to have emission occur primarily in the center of an emitter where the extracting field lines are primarily straight.

What is needed in the field emission electron emitter technology area is a field emission electron emitter that provides a higher efficiency than the prior art, that can be made more consistently at a lower cost than the prior art, that is more immune to environmental effects as well as the need for high vacuum environments typically required in the prior art, and that has a greater emission efficiency rate about the center region in planar electron emitter devices over that of the prior art.

SUMMARY OF THE INVENTION

According to the present invention, an improved field emission device for use within an ultra-high density storage system is disclosed. The field emission device is a planar electron emitter that has an emitter electrode, an extractor electrode, and a planar emitter electron emission layer, electrically coupled to the emitter electrode and the extractor electrode. The planar electron emitter is configured to bias electron emission in a central region of the emission layer in preference to an outer region thereof. One example to perform this biasing is achieved by fabricating the planar emitter electron emission layer so that it has an outer perimeter that is thicker in depth than at an interior portion of the planar emitter emission layer, which reduces electron beam emission at the outer perimeter when an electric field is applied between the emitter electrode and the extractor electrode. The electric field draws electrons from the surface of the planar emitter electron emission layer towards the extractor electrode at a higher rate at the interior portion than at the outer perimeter. The planar emitter device further includes a focusing electrode electrically coupled to the planar electron emitter. To achieve the improved electron emission rate at the center region, the planar electron emitter device has a generally concave top surface.

In an alternative embodiment, planar emitter emission layer comprises a metal first layer and a semiconductor second layer deposited on the metal first layer. The metal layer may be fabricated from platinum, gold, silver, or a metal semiconductor composite layer while the semiconductor second layer comprises a wide band-gap semiconductor and is typically very weakly conductive of n-type. Additionally, the planar electron emitter device according to claim 1 also incorporates a dielectric placed between the emitter electrode and the extracting electrode and another dielectric between the extracting electrode and the focusing electrode.

A process for fabricating planar electron emitters utilized within an ultra-high density memory apparatus comprises the steps of forming an emitter electrode layer, forming an extracting electrode layer, exposing the emitter electrode layer by removing at least a portion of the extracting electrode layer, and depositing a semiconductor material above the emitter electrode in a manner resulting in a controlled thickness gradient extending from a center location of the semiconductor material deposited to an outer perimeter of the semiconductor material deposited. The process may further comprise, prior to forming the extracting electrode layer, forming a metal layer on the emitter electrode layer wherein the depositing step places the semiconductor material on the metal layer. Additional processing steps consistent with achieving the planar electron emitter device previously described are also contemplated. These would include fabricating the planar electron emitters so that the semiconductor material deposited above the emitter electrode forms a concave top surface as well as forming a focus electrode with necessary insulating dielectric layers.

The planar electron emitter device is intended to be utilized, among other uses, within a storage apparatus that has a storage medium having a storage area, the storage area being in one of a plurality of states to represent the information stored in that storage area. The field emitter generates an electron beam current that is utilized to read or write the information stored in the storage areas.

BRIEF DESCRIPTION OF THE DRAWINGS

Features and advantages of the present invention will become apparent to those skilled in the art from the following description with reference to the drawings, in which.

DETAILED DESCRIPTION OF SPECIFIC EMBODIMENTS

Figure 1:
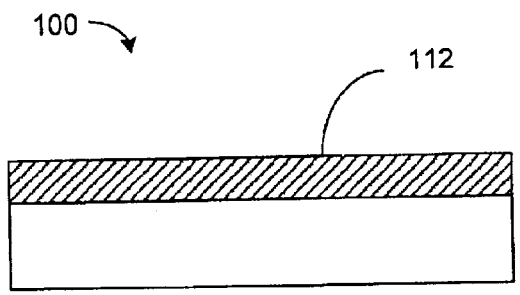
FIG. 1 is a cross-sectional view of a planar field emission electron emitter device substrate with polycrystalline layer applied thereto.

An improved planar field emission electron emitter structure that is typically utilized within an ultra-high density storage device is disclosed in FIGS. 1–5. The emitter structure 100 utilizes a solid state mechanism to enhance and improve electron emission for use in structures such as ultra-high density storage devices, previously disclosed in U.S. Pat. No. 5,557,596, incorporated by reference for all purposes, and in field emission-based display systems such as the type disclosed in U.S. Pat. No. 5,587,628, incorporated by reference for all purposes. The structure is also based on the structure described and illustrated in WO 00/70638, published Nov. 23, 2000, as well as French patent No. FR9906254.

The solid state mechanism utilizes a thin metal layer placed upon the emitter electrode of the planar field emission electron emitter device. Next, a thin layer of wide band-gap semiconductor material is placed upon the metal layer, which forms a Schottky metal-semiconductor junction to enhance electron beam formation and emission. Since the formation of the beam of electrons occurs at an interface protected from environment, the emitter structure becomes less sensitive to environmental factors such as contamination, and temporal and spatial emitted beam instabilities due to molecular desorption and adsorption commonly found in prior art emitter structures lacking the Schottky metal-semiconductor junction are minimized. Further, the solid-state mechanism lowers the field required for emission thereby reducing driver voltage requirements that have been an impediment to the use of planar emitter geometries and can also eliminate the need for intrinsically low material work-function materials required in the prior art.

The barrier further provides a high level of immunity from contaminants migrating in strong electric field gradients associated with the emitter tip structures. The field gradients are reduced in the direction of the emitting area, thereby reducing the motion of material contaminants. Additionally, in a planar emitter geometry noise is minimized due to a current averaging over a larger emitting area than is otherwise provided in tip geometries. This planar emitter geometry is again made possible by the use of the Schottky metal-semiconductor junction and lowered fields required to emit electrons. The protective barrier also reduces the need for high vacuum during the finishing stages as contaminants that have plagued the prior art are of little effect now. This further reduces the cost of manufacture and improves the life span of devices incorporating the technology of the instant invention.

Each planar field emission electron emitter structure further includes additional electrodes that are utilized to perform electron extraction from the surface of the field emission electron emitter. An extraction electrode and a focusing electrode typically operate in conjunction with one another to provide the appropriate electric field necessary to first extract, then focus, or otherwise control, the emitted electron beam. Generally, planar emitter geometries provide a primarily collimated beam while tip emitter geometries provide a divergent beam.

The improved planar field emission electron emitter structures are fabricated using well-known semiconductor fabrication techniques such as those practiced by those skilled in the art. Typically, and for purposes of example only, the described methods and structures are performed on silicon substrate, but other semiconductor materials may be readily substituted, such as using gallium arsenide or germanium in place of silicon, or the substrate can be nonconductive as glass or sapphire. A process, with the resulting structure at various stages and at completion of the planar field emission electron emitter, is now presented in conjunction with FIGS. 1–5.

FIG. 1 illustrates a cross-sectional view of a planar emitter device 100 that begins with a substrate 110 upon which the emitters are fabricated in various layers of semiconductor material, metal material, or oxide layers according to techniques and procedures well known to those skilled in the art. First, an electrode layer of conductive material 112 is fabricated on the first substrate 110. The top surface of the substrate may be planarized using generally accepted methods such as chemical-mechanical polishing (CMP). The layer 112 is typically comprised of metal or doped polycrystalline silicon to serve as the first portion of the emitter electrode utilized in the planar field emission electron emitter device 100 in accordance with the present invention. The conductive layer 112 may be optional in some embodiments.

Figure 2:
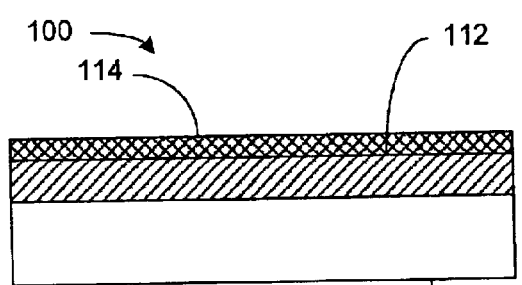
FIG. 2 depicts a cross-sectional view of the planar field emission electron emitter device according to FIG. 1 with a metal layer being deposited on the polycrystalline layer.

Next, as illustrated in FIG. 2, a thin layer of metal 114 is deposited upon the surface of electrode layer 112 using conventional metal deposition techniques known to those skilled in the art. The metal layer 114 may be formed from a highly conductive and corrosion resistant metals (platinum, tungsten, molybdenum, titanium, copper, gold, silver, tantalum, etc. and any alloys or multilayered films thereof) that can bond with a semiconductor to form a Schottky metal-semiconductor barrier. The conductive layer 112 has a thickness range of 0.1 to 0.5 micrometers and metal layer 114 has a thickness ranging from 10 to 100 nanometers (nms), with 20 nms being preferred. Alternatively layers 112 and 114 can be combined and made of the material constituting layer 114 with a thickness assuring appropriate electrical conductivity.

Figure 3:
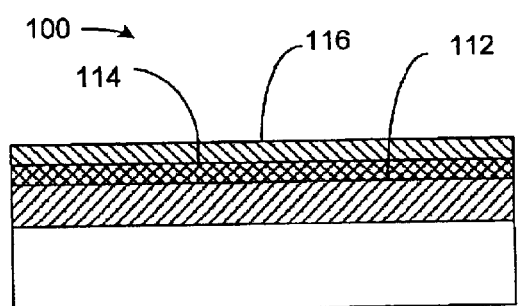
FIG. 3 illustrates a cross-sectional diagram of the planar field emission electron emitter device according to FIG. 2 wherein an insulating semiconductor layer is formed over the metal layer to form a Schottky metal-semiconductor barrier.

Next, as illustrated in FIG. 3, a second semiconductor layer 116 is deposited upon metal layer 114. Semiconductor layer 116 is typically comprised of a wide band-gap semiconductor material such as titanium oxide ($TiO_2$). Other types of wide band gap semiconductor materials would also be suitable and include silicon carbide (SiC), diamond like carbon, $SiO_2$ $Al_2O_3$, tantalum pentoxide and others.

The metal-semiconductor boundary provides a solid state Schottky metal-semiconductor barrier. When an electric field is applied, electrons are injected into a field controlled low or negative electron affinity region within the thin semiconductor layer 116. The emitter device 100 utilizes a layer of metal to serve as an electron reservoir and then includes an ultra thin layer of semiconductor material covering the metal layer. The semiconductor material is fabricated to provide a negative electron affinity surface area that is induced when a field is applied to the structure. For example semiconductor layer 116 may be formed from but not limited to materials such as the oxides, nitrides, and oxynitrides of silicon, aluminum, titanium, tantalum, tungsten, hafnium, zirconium, vanadium, niobium, molybdenum, chromium, yttrium, scandium, and combinations thereof. Electrons from the metal layer 114 tunnel through the thin semiconductor layer 116 near its surface and are emitted from the top of layer 116.

The thickness of insulating semiconductor layer 116 is selected to achieve the negative electron affinity condition upon application of an electric field. The lower bound on the thickness is determined by the minimum thickness required to create such region. The upper bound on the thickness of the semiconductor layer 116 is determined by the potential necessary to cause electron transport in the layer 116. The thicker the semiconductor layer 116 is, the higher the required potential. As such, the thickness of semiconductor layer 116 has a range of 2 to 8 nms with 5 nms being preferred.

Figure 4:
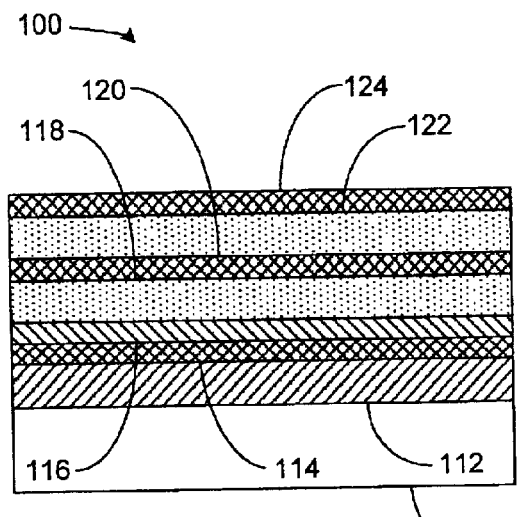
FIG. 4 depicts a cross-sectional view of the planar field emission electron emitter device according to FIG. 3 wherein additional insulating and metal layers are formed in accordance with the present invention.

After the Schottky metal-semiconductor barrier is formed, additional conventional processing steps are performed as illustrated in FIG. 4 in accordance with the present invention. These steps include providing electrodes proximate the planar field emission electron emitter surfaces on the surface of the emitter 100. Dielectric layers are also formed to provide separation and insulation from the surface of the emitter as well between the additional electrode layers. Alternatively Schottky metal-semiconductor barrier is formed after other structures are created.

An insulating dielectric 118 is grown on the surface of emitter 100, using conventional oxide growing and fabrication techniques well known to those skilled in the art. For example dielectric 118 may be formed from, but not limited to materials such as the oxides, nitrides, and oxynitrides of silicon, aluminum, titanium, tantalum, tungsten, hafnium, zirconium, vanadium, niobium, molybdenum, chromium, yttrium, scandium, and combinations thereof. The dielectric 118 may be formed such that the insulator is conformal with the layer 112. This layer 118 has a thickness ranging from 0.5 to 5 micrometers.

Next, a conductive layer 120 is deposited upon an oxide layer 118 using conventional processing techniques well known to those skilled in the art. The conductive layer 120 may be formed from metal (aluminum, tungsten, molybdenum titanium, copper, gold, silver, tantalum, etc. and any alloys or multilayered films thereof), doped polysilicon, graphite, etc. or combinations of metal and non-metal, e.g. C, films. Conductive 120 is typically utilized as an extracting electrode in the emitter structure 100.

After the formation of the conductive layer 120, an isolating and insulating layer of dielectric material is applied in layer 122. Layer 122 may be identical to layer 118 and fabricated in the same manner or it may be of similar substance to provide a dielectric isolation between electrode metal layer 120 and a subsequent conductive layer 124.

Conductive layer 124 is fabricated on the surface of dielectric layer 122 using well-known fabrication techniques similar to that utilized to form layers 114 and 120. Layer 124 may be fabricated out of the same metal as that used in layers 114 and 120, but it may also be fabricated out of a different conductive metal typically used by those skilled in the art. Further, conductive layer 124 serves as a focusing electrode in focusing the emitted electrons from the surface of the emitter during operation to the storage medium proximate thereof, for one example.

A final patterning and etching is performed to open holes above semiconductor layer 116 to expose the emitter surface. These techniques are well known to those skilled in the art and are used to form openings through conductive layers 120 and 124 and to etch back insulating dielectric layers 118 and 122 in such a way as to provide openings for the electrons to pass when utilized in their functional design. The holes typically have a diameter of about 0.1–10 micrometers.

Dielectric layer 122 has a thickness of about one half that of the hole diameter and ranges from 0.05 to 5 micrometers. Metal layer 120 has a thickness of about 0.05 to 0.3 micrometers. Likewise, conductive layer 124 has a thickness range of 0.05 to 0.3 micrometer. Further, although it has been depicted that conductive layer 120 serves as the extracting electrode and conductive layer 124 serves as a focusing electrode, their operations may be combined so that they act in tandem to extract and focus electrons. In another embodiment the wide band gap semiconductor layer 116 and possibly metal layer 114 are not formed until after the extracting electrodes 120 and 124 and associated dielectric layers 118 and 122 are deposited and hole apertures are created. Layers 114 and 116 are then deposited through these apertures directly on electrode 112.

It is further contemplated that not a single emitter structure 100 is fabricated at one time but generally an array of such emitter devices 100 are fabricated. For example, an array of 100-by-100 emitters 100 may be made to perform the read and write operations within the ultra-high density storage system described earlier. Further, a large array of such emitter devices may also be utilized in field emission display panels.

Figure 5:
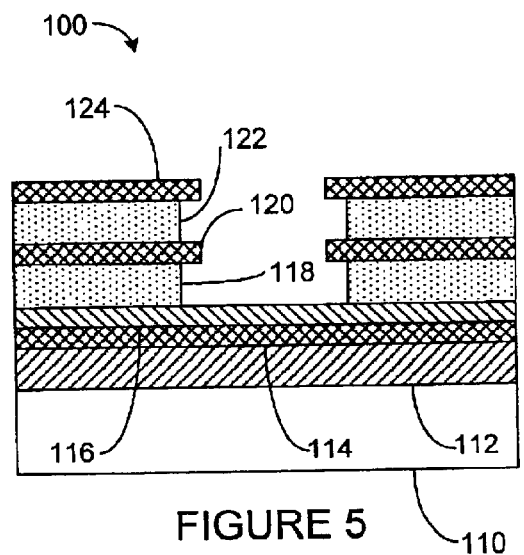
FIG. 5 illustrates a cross-sectional view of the completed planar field emission electron emitter device with openings formed to expose the surface of the semiconductor layer in accordance with the present invention.

Although the emitter structure 100 has been illustrated to have an electrode layer 112, such a layer is optional such that semiconductor substrate 110 is properly doped sufficiently to serve as the emitter electrode with metal layer 114 deposited thereon. Further, it has been shown that the emitter is a planar electron emitter with respect to the fabrication techniques and resulting structure depicted in FIGS. 1–5 in accordance with the present invention, other geometries are also possible utilizing the Schottky metal semiconductor barrier approach. The use of the Schottky metal-semiconductor barrier also allows for smaller geometries to be formed with respect to the focus emitter electrodes as well as the extracting electrode. The planar electron emitter as shown in FIG. 5 has a focus electrode and extraction electrode diameter of generally 2 micrometers. It can range from 1 to 10 micrometers. The focusing electrode provides the ability to collect electrons within a small (10 to 50 nm) spot on an anode. Without the use of the focusing electrode, the angle of emission is approximately $\pm 10°$ for the planar electron emitters.

Figure 6:
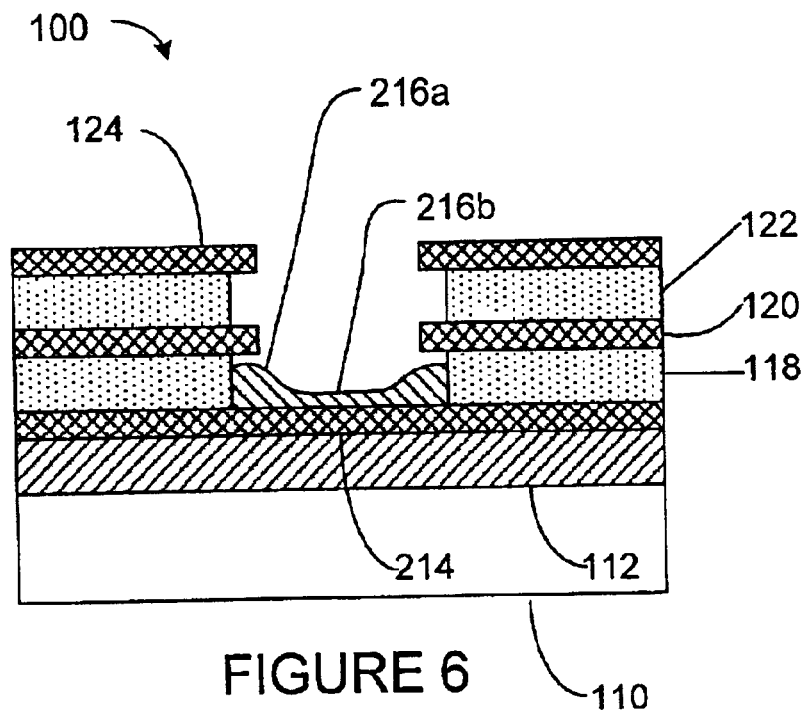
FIG. 6 illustrates a cross-sectional processing diagram of a planar field emission electron emitter device having a semiconductor layer that has a varied thickness in accordance with the present invention.

FIG. 6 illustrates an embodiment of the present invention wherein the semiconductor layer 216, which is placed upon metal layer 214, is fabricated so that the outer edges 216a of the semiconductor material is thicker than the interior portion 216b of the same. Specifically, the outer edges 216a have a thickness ranging from 10 to 15 nms while the center portion 216b has a thickness of about 5 nms. The thicker semiconductor material on the outer edges inhibits electron beam emission on the outer perimeter while the thinner semiconductor material in the central region provides for enhanced electron emission over that of the outer perimeter. This also greatly improves the emitter emission efficiency and ability to focus electrons over that of the prior art.

Figure 7:
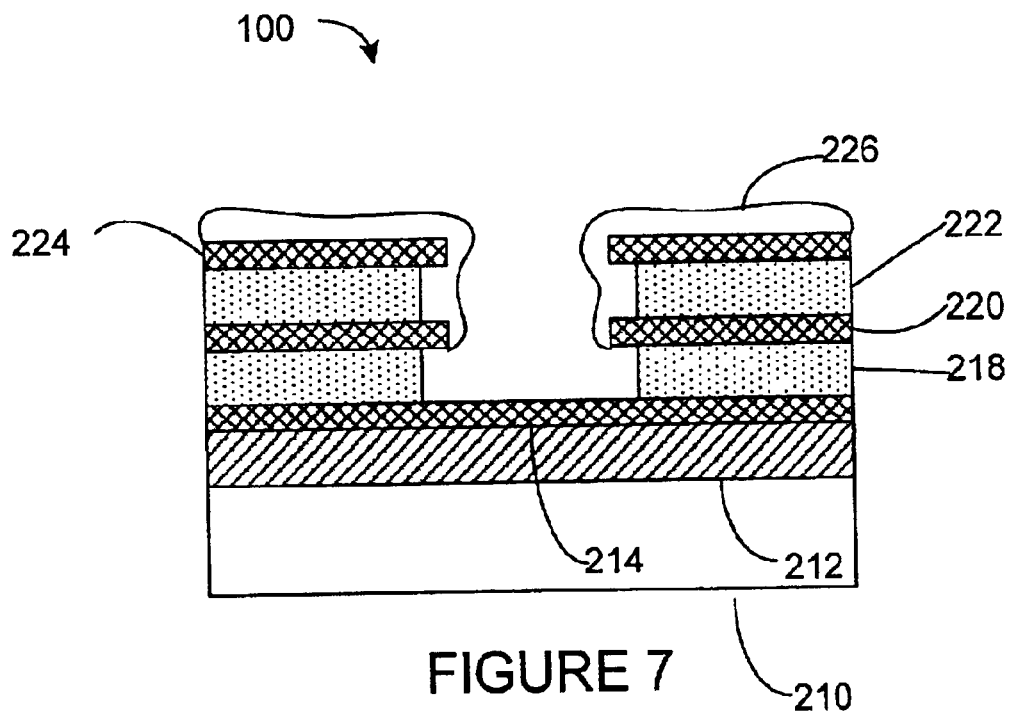
FIGS. 7 and 8 depict cross-sectional processing diagrams of the method and stages of manufacture of the planar field emission electron emitter device of FIG. 6.
Figure 8:
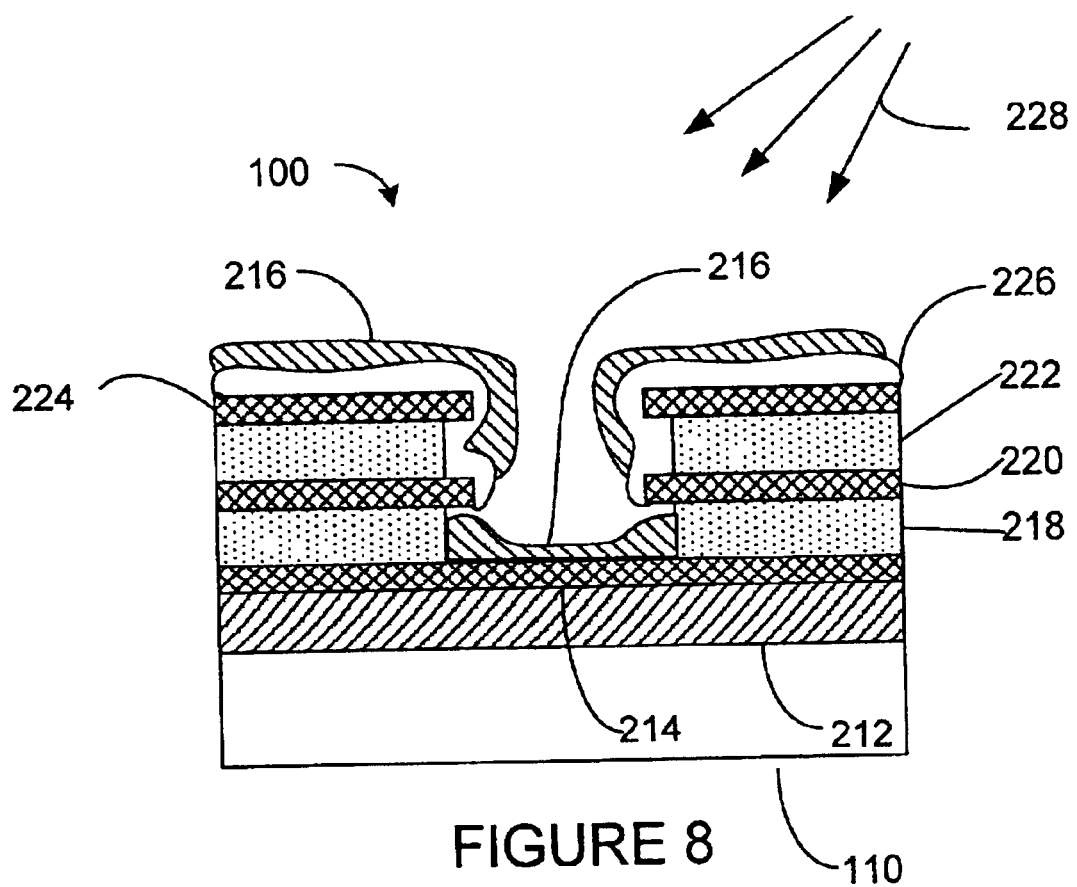

The thicker outer perimeter of the semiconductor material is fabricated in accordance with the processing steps illustrated in FIGS. 7–8. FIG. 7 illustrates a cross section of a second embodiment of an electron emitter according to another aspect of the present invention in a process step prior to semiconductor layer deposition.

The second embodiment includes many of the same features described herein with respect to FIGS. 1–5. At this point the semiconductor emitter electrode 212 as originally described with respect to FIG. 1 is produced and the metal layer 214 is applied onto electrode layer 212. Next, alternating layers of insulating oxide material and metal layers are fabricated on the surface of metal layer 214. Afterwards, a masking step and passivation step are performed in order to open regions directly above the metal layer 214 underneath the oxide and electrode layers. Thus, as shown in FIG. 7, there is a base substrate layer 210, on which an emitter electrode electron supply layer 212 has been formed and upon that, a metal layer 214 is formed. These steps are consistent with those previously described in FIGS. 1 and 2. Next, the oxide layer 218 has been formed with a portion removed in order to reveal the underlying metal layer 214. A second metal layer, which serves as an extraction electrode 220, is next formed. Upon extracting electrode 220 is formed a second insulating layer of silicon dioxide or its equivalent. Next, a final metal layer 224 is formed on semiconductor insulating layer 222. Again, each of these layers is opened in subsequent processing steps to expose a surface of the metal layer 214. Alternatively layers 218 through 224 are deposited sequentially and the hole access to layer 214 is formed through these layers in one step.

Next, as shown in FIG. 7, a parting layer 226 is fabricated on all surfaces except for the open metal layer 214. The parting layer 226, typically comprised of aluminum or another suitable parting material, is applied by first rotating the entire substrate about an axis perpendicular to the surface of the substrate and generating a collimated beam of parting material directed at an angle relative to the axis perpendicular to the surface. The parting layer 226 coats the entire surface, save the surface of the metal layer 214, which is shadowed by the geometry of the access hole.

With the parting layer 226 in place, a somewhat divergent beam of semiconductor material 228 is then directed on the substrate, as shown in the cross-sectional illustration of FIG. 8, to grow an insulating semiconductor layer, such as titanium dioxide, on the parting layer 226 as well as on the bare surface of the metal layer 214 wherein insulating semiconductor layer 216 is formed. The beam is directed at an angle relative to the perpendicular axis and the substrate rotates about the axis during deposition. The parting layer 226 enables the remaining titanium dioxide, or the non-necessary semiconductor material to be removed during a removal step well known to those skilled in the art. Since the semiconductor material is diffused within a somewhat-divergent beam of application material, the outer perimeter of the layer 216 grows thicker on the outer portion than it does on the center portion because of the rotation of the semiconductor substrate and the angle at which the beam is applied.

Afterwards, the entire wafer is submerged in parting layer solvent that removes the parting layer along with the excess semiconductor material or titanium dioxide applied to it. Since the semiconductor layer 216 bonds physically with the metal layer 214, it is resistant to the parting layer solvent, resulting in the structure shown in FIG. 6. This results in a semiconductor layer 216 that has thicker outer regions relative to the center region. The increased thickness on the outer regions inhibits electron emission from these regions while the thinner thickness of the semiconductor material is more conducive to electron emission, thus increasing the efficiency in the center region that results in improved focusing of the beam on a storage medium and thus more accurate reads and writes during the mass storage read and write operations intended for use with the planar field emission electron emitter device of FIGS. 5 and 6.

Other embodiments of the invention will be apparent to those skilled in the art from a consideration of this specification or practice of the invention disclosed herein. It is intended that the specification examples be considered as exemplary only, with the true scope and spirit of the invention being indicated by the following claims.

It is to be understood that the above-described arrangements are only illustrative of the application for the principles of the present invention. Numerous modifications and alternative arrangements may be devised by those skilled in the art without departing from the spirit and scope of the present invention and the appended claims are intended to cover such modifications and arrangements. Thus, while the present invention has been shown in the drawings and fully described above with particularity and detail in connection with what is presently deemed to be the most practical and preferred embodiment(s) of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

What is claimed is:

1. A planar electron emitter device, the planar electron emitter device comprising:
   an emitter electrode;
   an extractor electrode; and
   a solid-state field controlled electron emitter having a Schottky metal-semiconductor junction fabricated on the emitter electrode and electrically coupled to the extractor electrode such that an electric potential placed between the emitter electrode and the extractor electrode results in field emission of electrons from an exposed surface of the Schottky metal-semiconductor junction, wherein the semiconductor layer of the Schottky metal-semiconductor junction includes an outer perimeter that is thicker in depth than at an interior portion of the semiconductor layer thereby reducing electron beam emission at the outer perimeter wherein an electric field applied between the emitter electrode and the extractor electrode draws emission electrons from the surface of the planar electron emitter towards the extractor electrode at a higher rate at the interior portion than at the outer perimeter.

2. The planar electron emitter device according to claim 1 further comprising a focusing electrode electrically coupled to the planar electron emitter.

3. The planar electron emitter device according to claim 2 further comprising a second dielectric placed between the extracting electrode and the focusing electrode.

4. The planar electron emitter device according to claim 1 wherein the planar electron emitter has a generally concave top surface.

5. The planar electron emitter device according to claim 1 wherein the planar electron emitter comprises a metal first layer and a semiconductor second layer deposited on the metal first layer.

6. The planar electron emitter device according to claim 5 wherein the semiconductor second layer comprises a wide band-gap semiconductor.

7. The planar electron emitter device according to claim 1 further comprising a dielectric placed between the emitter electrode and the extracting electrode.

8. A planar field emission electron emitter device, the field emission electron emitter device comprising:

an emitter electrode;

an extractor electrode; and a planar electron emitter, electrically coupled to the emitter electrode and the extractor electrode to provide an electric field to draw emission electrons from the surface of the planar electron emitter wherein the planar electron emitter is configured to bias electron emission in a central region in preference to an outer region.

9. The field emission electron emitter device according to claim 8 further comprising a focusing electrode electrically coupled to the planar electron emitter.

10. The planar field emission electron emitter device according to claim 9 further comprising a second dielectric placed between the extracting electrode and the focusing electrode.

11. The planar field emission electron emitter device according to claim 8 wherein the planar electron emitter has a generally concave top surface.

12. The planar field emission electron emitter device according to claim 11 wherein the planar electron emitter comprises a metal first layer and a semiconductor second layer deposited on the metal first layer, the semiconductor second layer having a generally concaved top surface.

13. The planar field emission electron emitter device according to claim 12
wherein the semiconductor second layer comprises a wide band-gap semiconductor.

14. The planar field emission electron emitter device according to claim 8 further comprising a dielectric placed between the emitter electrode and the extracting electrode.

* * * * *

UNITED STATES PATENT AND TRADEMARK OFFICE
CERTIFICATE OF CORRECTION

PATENT NO.        : 6,914,374 B2                                              Page 1 of 1
APPLICATION NO.   : 10/043376
DATED             : July 5, 2005
INVENTOR(S)       : Henryk Birecki et al.

It is certified that error appears in the above-identified patent and that said Letters Patent is hereby corrected as shown below:

In column 9, line 5, in Claim 1, after "surface of" insert -- a semiconductor layer above --.

In column 9, line 6, in Claim 1, after "wherein the" insert -- exposed surface of the --.

In column 9, line 9, in Claim 1, after "of the" insert -- exposed surface of the --.

In column 10, line 8, in Claim 8, after "configured" delete "to" and insert -- to have a variable thickness, to thereby --, therefor.

Signed and Sealed this

Sixteenth Day of March, 2010

David J. Kappos
*Director of the United States Patent and Trademark Office*